J. G. YONKESE.
AIRPLANE.
APPLICATION FILED JAN. 19, 1920.

1,395,693.

Patented Nov. 1, 1921.
7 SHEETS—SHEET 1.

Inventor
J. G. Yonkese
By D. Swift
MS Attorney

J. G. YONKESE.
AIRPLANE.
APPLICATION FILED JAN. 19, 1920.
1,395,693.
Patented Nov. 1, 1921.
7 SHEETS—SHEET 3.
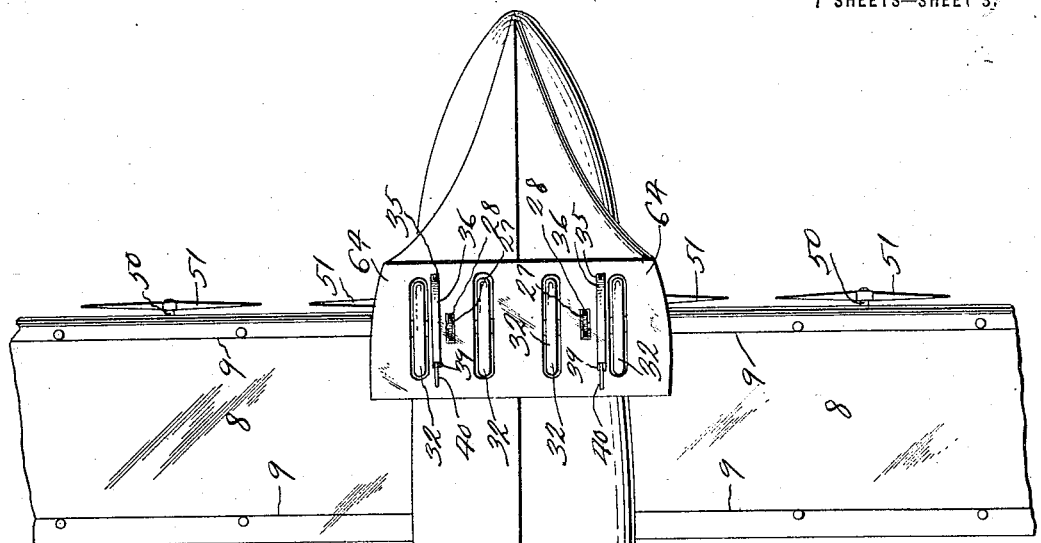
Fig. 3
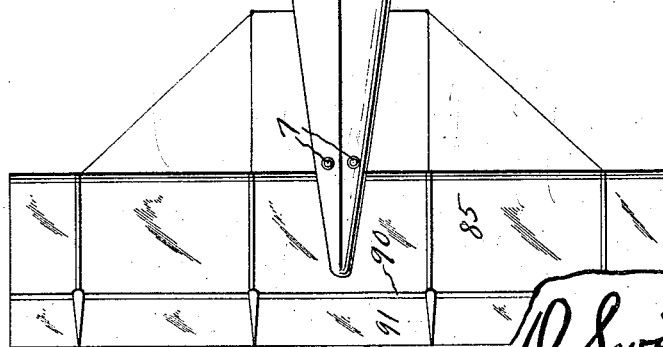
Inventor
J. G. Yonkese
By D. Swift
Attorney J. G. YONKESE.
AIRPLANE.
APPLICATION FILED JAN. 19, 1920.
1,395,693.
Patented Nov. 1, 1921.
7 SHEETS—SHEET 4.
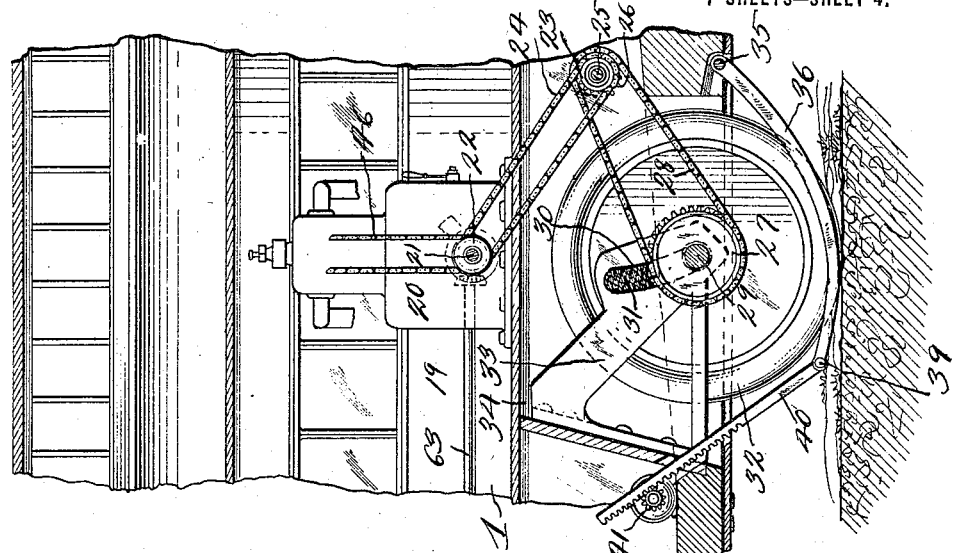
Inventor
J. G. Yonkese
By D. Swift
Attorney

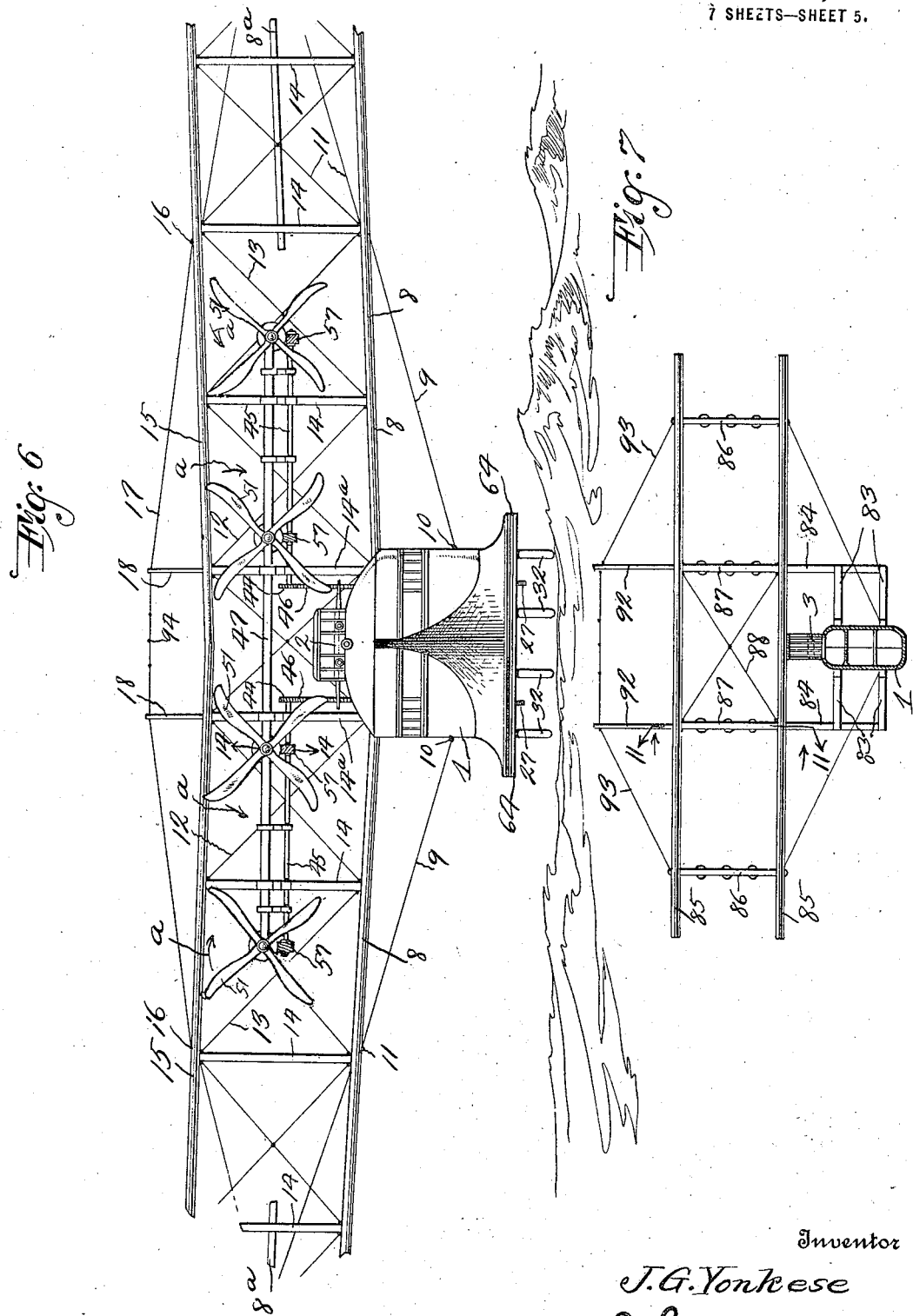

J. G. YONKESE.
AIRPLANE.
APPLICATION FILED JAN. 19, 1920.
1,395,693.
Patented Nov. 1, 1921.
7 SHEETS—SHEET 6.
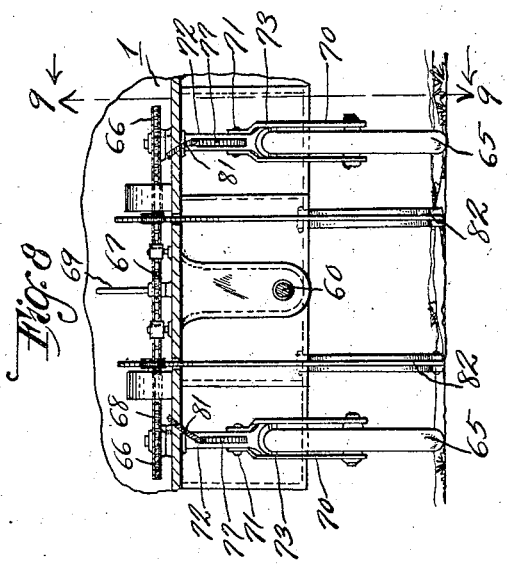
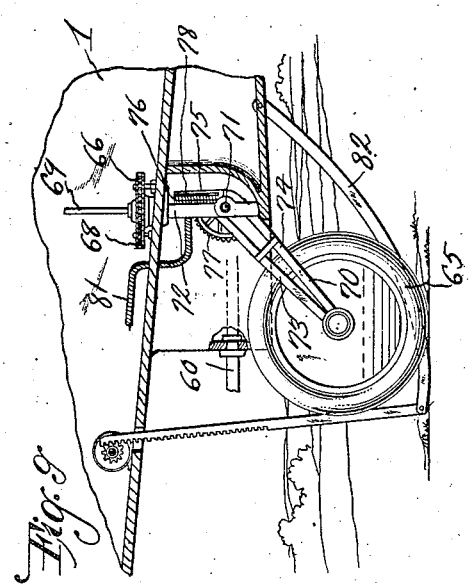
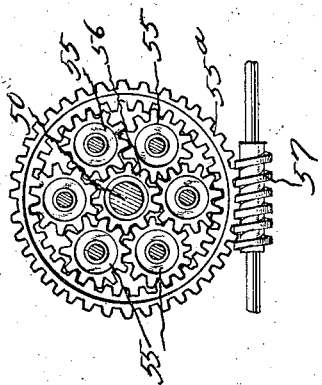
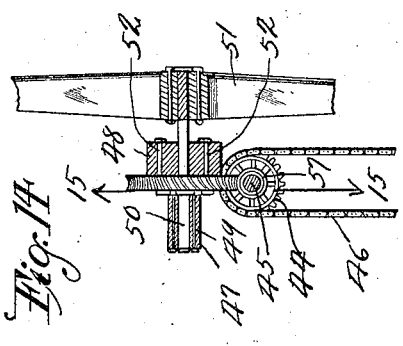
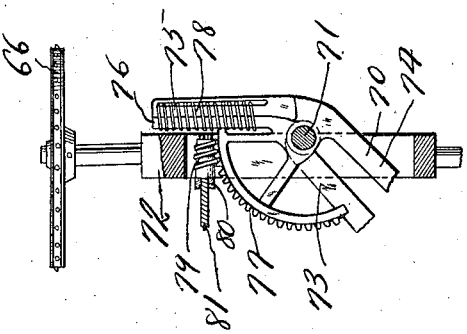
Inventor
J. G. Yonkese
By D. Swift
his Attorney J. G. YONKESE.
AIRPLANE.
APPLICATION FILED JAN. 19, 1920.
1,395,693.
Patented Nov. 1, 1921.
7 SHEETS—SHEET 7.
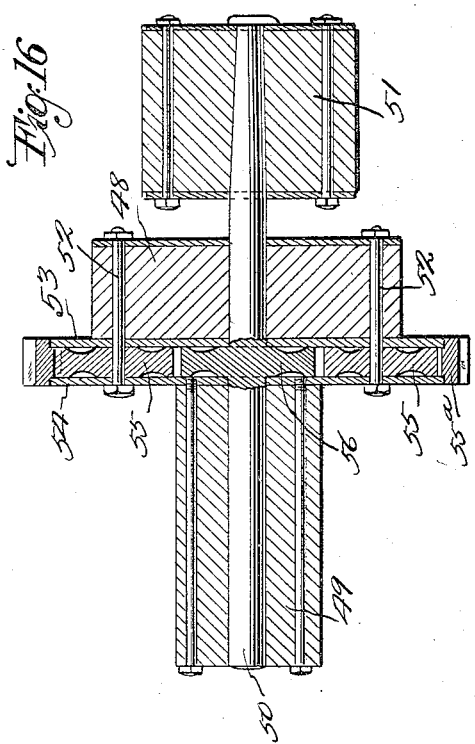
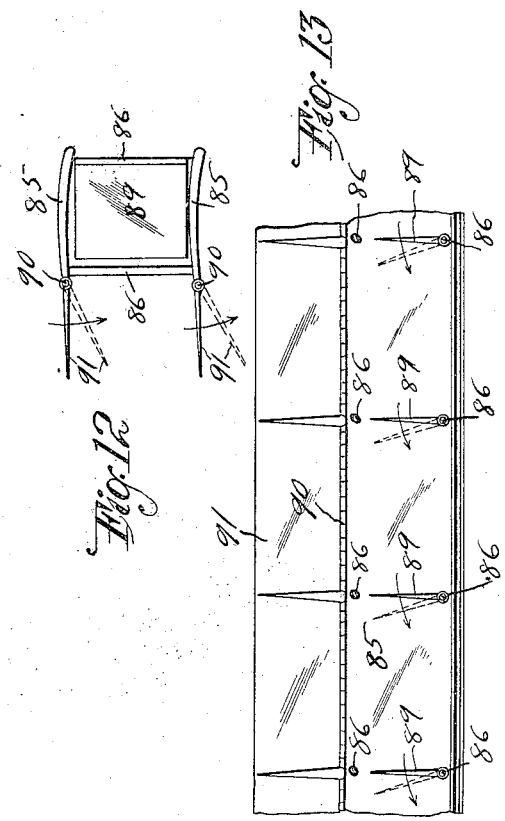
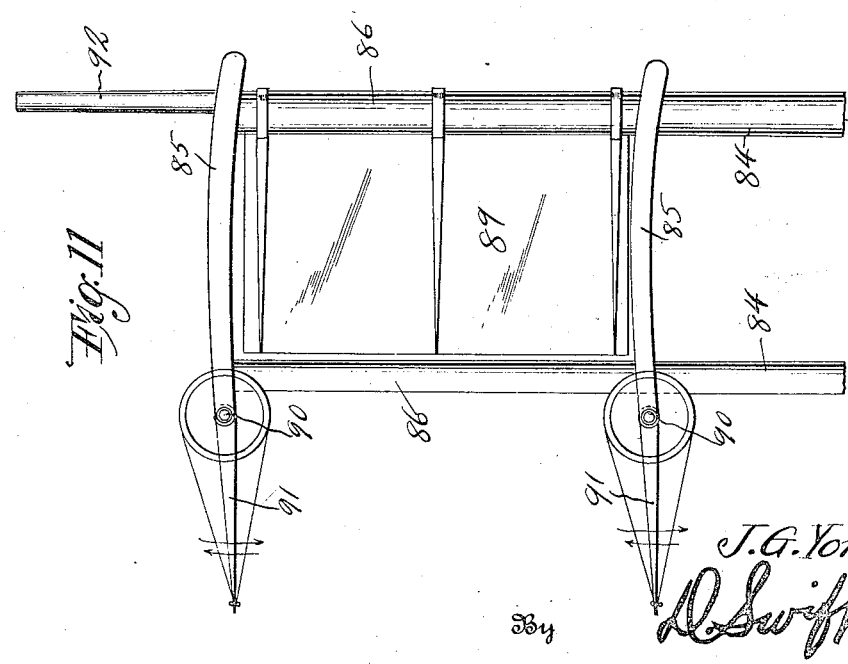
Inventor
J. G. Yonkese
By L. Swift
Attorney

UNITED STATES PATENT OFFICE.

JOSEPH G. YONKESE, OF BROOKLYN, NEW YORK.

AIRPLANE.

1,395,693.   Specification of Letters Patent.   Patented Nov. 1, 1921.

Application filed January 19, 1920. Serial No. 352,575.

*To all whom it may concern:*

Be it known that I, JOSEPH G. YONKESE, a citizen of the United States, residing at Brooklyn, in the county of Kings, State of New York, have invented a new and useful Airplane; and I do hereby declare the following to be a full, clear, and exact description of the invention, such as will enable others skilled in the art to which it appertains to make and use the same.

The invention relates to airships and has for its object to provide an airship particularly designed for the carriage of passengers, either in the air, on the surface of the water or on the land. The airship being so designed so that the same may be constructed of such a size so as to have practically unlimited capacity. Also to provide means whereby the ship may be propelled on the surface of the water and on land.

A further object is to provide an airship having a series of propellers transversely disposed which propellers are driven from an engine located within the fuselage and to provide controlling means whereby the propellers may be controlled.

A further object is to provide transversely disposed landing wheels carried by the fuselage, preferably adjacent the forward end thereof, said landing wheels being mounted on a shaft which shaft is slidably mounted in slots and acts against cushioning means when the ship lands so as to take up the shock of landing. Also to provide means whereby said landing wheels may be revolved so that the ship may be propelled on land.

A further object is to provide adjacent the landing wheels a forwardly and upwardly inclined plane adapted to facilitate the launching of the ship from the water.

A further object is to provide steering means for the airship while in the air, said steering means comprising horizontally pivoted elevators which elevators cause the ship to be moved in a vertical plane upwardly or downwardly and to provide vertically pivoted rudders so that the ship may be steered in a horizontal plane, said vertical rudders being preferably pivoted between stabilizers.

A further object is to provide landing wheels adjacent the rear end of the airship, which landing wheels are provided resilient means whereby the shock of landing will be taken up and also shocks incident to the wheels running over the ground during a landing operation, or when the ship is being propelled over the ground. Also to provide means whereby said wheels may be moved so as to guide the ship on the ground and to provide means whereby said wheels may be pivoted upwardly when the ship is in the air or in the water so that they will not retard the progress of the ship.

A further object is to provide means for driving the ship when the same is on the water and also means for steering the same while on the water.

A further object is to provide an air ship which may be built on such dimensions as to allow the mounting thereon of numerous guns, searchlights and other instruments of war and one wherein it will be possible for carrying a great number of passengers. A further object is to provide an airship so constructed that it may be propelled in the air and on the ground from a single source of power. Also to provide means whereby the ship may be propelled on the water from said single source of power.

A further object is to provide the airship with a wireless aerial preferably supported between the wings of the airship and the stabilizer.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Fig. 3 is a bottom plan view of the airship.

Fig. 4 is a transverse sectional view taken on line 4—4 of Fig. 1.

Fig. 5 is a sectional view taken on line 5—5 of Fig. 4.

Fig. 6 is a front elevation of the airship.

Fig. 7 is a sectional view taken on line 7—7 of Fig. 1.

Fig. 8 is a detail sectional view taken on line 8—8 of Fig. 1, showing the rear landing wheels.

Fig. 9 is a detail view of one of the rear landing wheels, said view being taken on line 9—9 of Fig. 8.

Fig. 10 is an enlarged detail view of the bracket of one of the rear landing wheels.

Fig. 11 is a sectional view through the stabilizers taken on line 11 of Fig. 7.

Fig. 12 is a view similar to Fig. 11, but showing the elevating members at an angle.

Fig. 13 is a horizontal sectional view taken on line 13—13 of Fig. 1.

Fig. 14 is a sectional view through the propeller hub and its adjacent drive mechanism, taken on line 14—14 of Fig. 6.

Fig. 15 is a sectional view taken on line 15—15 of Fig. 14.

Fig. 16 is a detail view of the propeller shaft drive gears.

Figure 1:
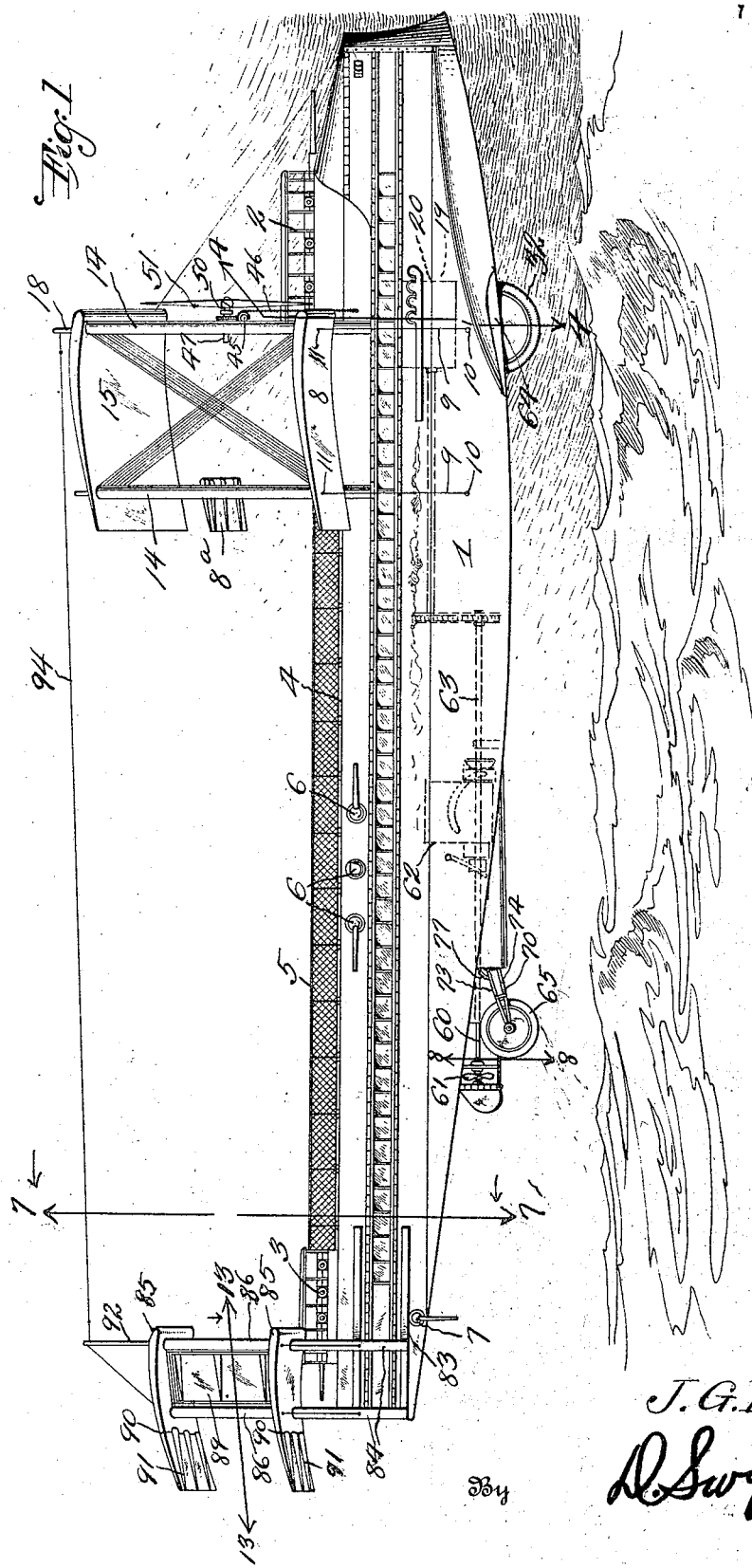
Figure 1 is a side elevation of the airship showing the same in flight.
Figure 2:
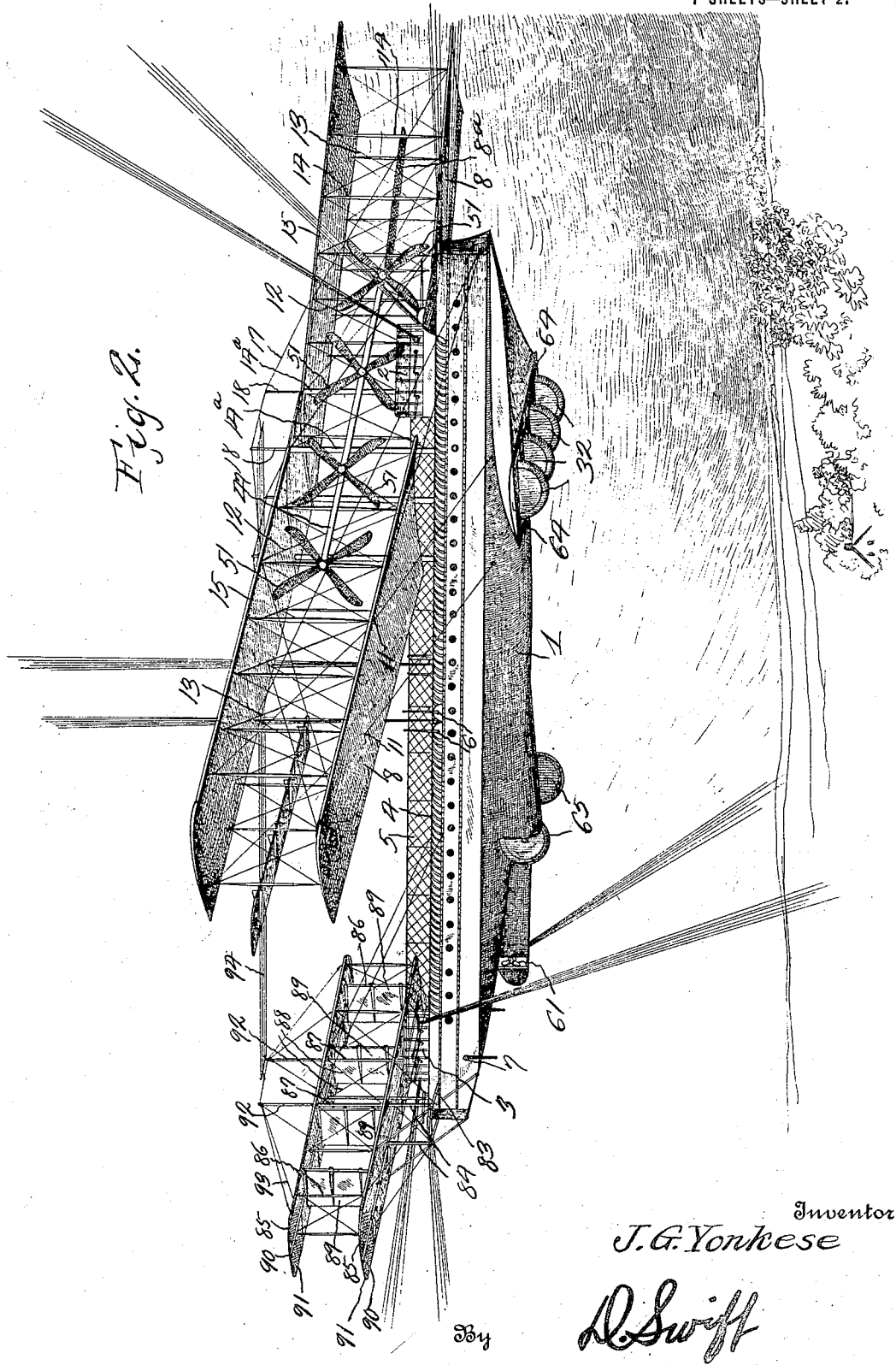
Fig. 2 is a perspective view of the airship.

Referring to the drawings the numeral 1 designates the fuselage of the airship which fuselage at its forward and rear ends is provided with gun pits in which guns may be mounted said gun pits being designated by the numerals 2 and 3. The upper side of the fuselage may be provided with a deck 4, on which deck passengers or crew may walk. The railings 5 on each side of the deck or promenade are preferably formed from a wire mesh work, which mesh work and railings may be removed when the airship is in flight. The sides of the fuselage are provided with gun ports 6 through which gun ports, guns may project and be so mounted so that they may be trained in horizontal plane or vertically as desired, however, for down firing guns may project as at 7 downwardly so that they may be brought to bear on hostile crafts or shore guns. All of the guns if so desired may be so mounted that when they are not in use they may be disposed inwardly of the fuselage so that they will not form air resistance, thereby impeding the forward movement of the airship while in flight.

Extending outwardly from the sides of the fuselage are planes 8, which planes may be braced in any suitable manner by wires 9, which wires are secured as at 10 to the sides of the fuselage and extend outwardly and upwardly and have their outer ends secured as at 11 to the under faces of the planes 8. Wires 9 have their securing points 11 substantially midway between the ends of the planes and the sides of the fuselage so as to form additional braces which braces in connection with the flying wires 12 and ground wires 13, brace the wings in relation to each other and in relation to the body of the fuselage so that said body of the fuselage will be so braced that its weight will be equally distributed over the wings during a flying operation. Rising upwardly from the planes 8 are a series of struts 14, which struts have connected to their upper ends, the upper wings 15, which extend transversely of the airship and are in substantial vertical alinement with the wings 8. Secured to the upper faces of the wings 15 as at 16 is a brace wire 17 which extends transversely of the airship and over wing masts 18 so as to support the weight of the wings when the airship is resting on the ground, the action of brace wires 17 being practically the reverse of additional brace wires 9 which take up the tension stress when the air ship is in the air. Conventional forms of ailerons 8ª are provided.

Located within an engine compartment 19 of the fuselage is a conventional form of engine 20. Engine 20 may be an internal combustion engine, a steam engine, or if so desired, an electrically driven motor. However, for purposes of illustration a conventional form of internal combustion engine is shown. Engine 20 is preferably transversely disposed, and has secured to the ends of the drive shaft 21 thereof sprockets 22, which sprockets have extending around them and also around a sprocket 23 a chain 24. Sprocket 23 is mounted on a rotatable shaft 25, which rotatable shaft has also mounted thereon a sprocket 26 and around which sprocket 26 and around the sprocket 27 an endless chain 28 passes. Sprocket 27 is carried by a rotatable shaft 29, which shaft 29 is normally rotatably mounted in the lower ends of concentric slots 30 and is adapted to be forced upwardly against rubber cushions 31, when the wheels 32, which are carried by the shaft 27 are forced upwardly so that the shock of landing will be taken up in the cushioning means therefore preventing the sudden shocks from reaching the various parts of the airship during a landing operation. Concentric slots 30 are disposed in brackets 33 which may be secured in any suitable manner within a compartment 34 of the under face of the fuselage. Concentric slots 30 are concentric with the center of the shaft 25 so that as the shaft 29 is forced inwardly so as to compress the cushioning means during a landing operation, endless chain 28 will not be stretched and consequently broken. It will be seen that after the airship has landed that it may be propelled forwardly on the ground by means of the engine 20 through the medium of the sprocket chains 24 and 28. Pivoted forwardly of the wheels 32 as at 35, longitudinally disposed skids 36, which skids are adapted to engage the ground during a landing operation immediately before the wheels come in contact with the ground so that they will take up substantially half of the shock and the wheels take up substantially the other half. Pivoted to the rear end of the skids 36 as at 39 is an upwardly extending rack bar 40, which rack bar is adapted to be placed into mesh with a gear 41 carried by the shaft of a conventional form of disk clutch so that said disk clutch will when properly adjusted only slip after substantially half of the shock has been taken up, at which time the shaft 29 will be forced upwardly by the wheels 32 which engage the ground, so that the cushioning means is compressed for taking up the further shock. After the shock of landing has been taken up and the ship is resting on its wheels on the ground the ship as a whole may be propelled forwardly or rearwardly by the engine 20 through its connections with the shaft 29. However, before the air ship is propelled forwardly rack bars 40 are moved out of mesh with the gears 41 and the skids 36 moved upwardly until they are substantially housed within the fuselage. Engine shaft 21 extends beyond the sprockets 22 and has rotatably mounted thereon sprockets 42, which sprockets may be thrown into clutch with the shaft 21 so that said sprockets 42 will be revolved with said shaft, the clutches for throwing the sprockets 42 into engagement with the shaft 21 are designated by the numeral 43. Extending around sprockets 42, and extending upwardly through the fuselage to sprockets 44 carried by axially alined shafts 45, are sprocket chains 46, which sprocket chains 46 impart revoluble movement to the axially alined shafts 45. Secured to the forward struts 14 and the wings masts 14ª is a horizontal frame 47 which frame comprises parallel bars 48 and 49 in bearings of which bars are rotatably mounted a series of propeller shafts 50, to the forward ends of which shafts conventional forms of propellers 51 are secured. Secured to the rear face of the bar 48 by means of bolts 52 are spaced plates 53 and 54 which plates have rotatably mounted on the bolts 52 and disposed between the plates, planetary gears 55, which gears mesh with a centrally disposed drive gear 56 which is keyed or otherwise secured to the shafts 50. However, it is preferable that the gear 56 be turned so that it will be an integral part of the shaft 50. Extending around and in mesh with the gears 55 of each propeller drive mechanism is an internally and externally toothed gear 55ª with the outer teeth of which a worm gear of any conventional form meshes, said worm gear being designated by the numeral 57. It will be seen that as the gear 55ª is revolved that gears 55 will be revolved and as the gears 55 are in mesh with the gears 56 carried by the propeller drive shaft 50 that the drive shaft 50 will be driven at an exceedingly high speed, the ratio of speed of rotation of the propellers being regulated by the pitches of the gears 55 and 56. The worm gears 57 are carried by the axially alined shafts 45 which shafts are rotated by the sprocket chains 46, which lead to the engine drive shaft. It will be seen that as the shafts 45 are revolved that the propellers will be revolved for propelling the airship while in the air. Worms 57 are so constructed that the propellers will be driven in the direction of the arrows a as shown in Fig. 6. It being the object to so drive the propellers so that the adjacent propellers will revolve in opposite directions thereby relieving the strain upon the struts and wing masts 14ª.

Rotatably mounted in bearings of the rear end of the fuselage is a propeller drive shaft 60 to which drive shaft is secured a conventional form of propeller 61. The propeller 61 is adapted to propel the ship forwardly when the same rests upon the water, the power for rotating the propeller 61 being obtained through the drive shaft 60 which is driven by the engine 62. However when it is so desired engine 62 may be thrown into clutch with a shaft 63 which is geared to the engine 20 so that the power from engine 62 may be used as an additional driving power for the propellers 50. By providing engine 62 it will be seen that an auxiliary power is provided for driving the propellers 50 which is particularly adapted for use in case of emergency, for instance the breakdown of the engine 20 which is the main engine. From the above it will be seen that means is provided whereby the airship will be propelled, by an independent power when the same rests upon water. When the airship lights on the water and it is desired to rise again from the water, engines 20 and 62 are started which will cause the propellers 50 and 61 to rotate so that the craft will be forced forwardly on the surface of the water which will cause transversely disposed planes 64 to plane upwardly against the action or resistance of the water thereby assisting the lifting of the fuselage from the water in taking off. It is to be understood that the transversely disposed plane 64 may be of any size and may be located at any point, however, for purposes of illustration the same is shown in transverse alinement with the front landing wheels.

Pivotally mounted in bearings near the rear end of the fuselage are rear landing wheels 65, which landing wheels have secured to the upper ends of the brackets thereof sprockets 66 and around which sprockets and around a centrally disposed sprocket 67 a sprocket chain 68 passes, which sprocket chain when the sprocket 67 is rotated by means of a shaft 69 will cause the landing wheels 65 to simultaneously move so that the airship may be steered when the same is on the ground and is being propelled forwardly by the rotation of the forward landing wheels 32, also when the airship is being moved backwardly by said landing wheels 32.

The rear landing wheels 65 are rotatably mounted in brackets 70 which brackets are pivotally mounted as at 71 on the lower end of the steering post 72. Bracket 70 comprises arms 73 and 74, however arm 74 has an upwardly extending portion 75 substantially parallel to the steering post 72 and around the portion 75 and engaging portions 76 which is carried by a segmentally shaped rack 77 pivoted on the pivotal point 71 an endless rubber 78 passes. The ends of the rubber 78 being secured in any suitable manner so as to prevent unwinding of the same. Segmentally shaped rack 77 is rotated when the wheels 65 are moved upwardly or downwardly by means of a worm gear 79 which worm gear is rotatably mounted in bearings 80 in the bifurcation of the steering post 72. The rotation of the worm 79 being accomplished through a flexible shaft 81 which may lead to any suitable operating mechanism, which mechanism may be manually or otherwise operated. It will be seen that as the worm 79 is rotated that the segmentally shaped rack 77 will move so that the wheel supporting bracket 70 will be pivoted on the pivotal point 71. However when the wheels are in their down position and it is desired to utilize the landing wheels for engaging the ground, and the rubber 78 for breaking the shock of landing, it will be seen that the worm 79 will prevent the segmentally shaped rack 77 from rotating on its pivotal point 71, and as the segmentally shaped rack is connected to the vertical portion 76, said vertical portion 76 and segmentally shaped rack 77 will be prevented from rotation by the worm 79, therefore when the wheel engages the ground the portion 75 which is carried by the bracket 70 will be forced outwardly from engagement with the portion 76 so that the rubber 78 will be caused to stretch thereby taking up the shock of landing. However the initial shock on the rear landing wheel 65 is taken up by means of skids 82, one of which is preferably disposed on each side of the longitudinal center of the machine. Skids 82 are similar in construction and operation to the skids 36 located at the forward end of the fuselage adjacent the forward landing wheels.

Secured to the rear end of the fuselage by means of suitable braces 83 and struts 84 are transversely disposed stabilizers which stabilizers 85 are held spaced in relation to each other by struts 86 and tail masts 87, there being brace wires for bracing the central section between the tail masts, said wires being designated by the numeral 88. Pivotally secured so as to pivot in a horizontal plane are a series of rudders 89 which rudders may be controlled through any suitable operating mechanism whereby said rudders will move equilaterally so that the airship may be steered in a horizontal plane. Pivotally connected as at 90 to the rear edges of the stabilizers 85 are elevators 91 which elevators may be controlled in any suitable manner so that the airship may be steered in a vertical plane. Rising upwardly from the upper stabilizer 85 are tail masts 92 which masts serve in connection with the brace wires 93 to brace the tail and also serving as a rear supporting means for the aerial 94 of the wireless outfit, the forward end of the aerial being supported by the wire 17 which passes over the wing masts 18.

From the above it will be seen that an airship is provided, which airship will be propelled through the air, propelled on the surface of water, and also propelled on land. It will also be seen that an efficient means whereby the taking off of the airship from the water will be facilitated through the medium of the transversely disposed plane 24. By providing the resilient members for landing and the skids which are used in connection therewith that all shocks incident to the landing of the airship on the ground will be taken up before they reach the fuselage, thereby preventing the breaking and straining of the various parts of the machine. It will also be seen that power from the water propeller driving engine 62 may be utilized, if so desired for driving the propellers 50 through the main engine 20.

It is the object to provide the lower part of the fuselage with a solid material, such for instance as cork or other light material, thereby preventing the sinking of the ship which may otherwise occur if the solid material or cork were not provided. It is the object to have the solid construction from a point substantially above the water to the bottom of the fuselage.

The invention may be applied to any form or type of royal marine, motor boat or cruiser or airplane body desired. It being also understood that the above types may be made in any sizes desired.

It being also understood that the airship may be provided with folding wings so that the same may be folded inwardly so that they will not interfere with the progress of the ship as it moves over the ground, or over the water for instance when entering a port.

The invention having been set forth what is claimed as new and useful is:—

1. In combination with an airplane, of means for propelling said airplane while in the air, an engine for operating said air propelling means, landing wheels located at the forward end of the air plane, said landing wheels being resiliently mounted so as to take up the shock during a landing operation, landing wheels adjacent the rear end of the air plane, said last named landing wheels being resiliently mounted so as to take up the shock during a landing operation, means whereby power from the engine may be utilized for rotating the forward landing wheels so as to propel the airplane forwardly while on the ground, and skids located adjacent the forward and rear landing wheels whereby the initial shock of landing will be taken up.

2. In combination with an airplane, of means for propelling said airplane while in the air, an engine for operating said air propelling means, landing wheels located at the forward end of the airplane, said landing wheels being resiliently mounted so as to take up the shock during a landing operation, landing wheels adjacent the rear end of the airplane, said last named landing wheels being resiliently mounted so as to take up the shock during a landing operation, means whereby power from the engine may be utilized for rotating the forward landing wheels so as to propel the airplane on the ground, skids adjacent the forward and rear landing wheels for taking up the initial shock of landing, said skids being provided with means whereby they may be disposed substantially within the body of the fuselage when not in use, means whereby the rear landing wheels may be raised when not in use and means whereby said rear landing wheels may be controlled for steering the airplane over the surface of the ground.

3. A landing mechanism for airplanes, said landing mechanism comprising forwardly and rearwardly disposed wheels, said wheels being resiliently mounted, skids disposed on the under surface of the fuselage and having their forward ends pivoted thereto, the rear ends of said skids having pivoted thereto rack bars said rack bars being in mesh with gears carried by disk brakes, said brakes forming means for assisting in the breaking of the initial shock of landing, and means whereby said skids may be moved out of operative positions when not in use.

In testimony whereof I have signed my name to this specification in the presence of a subscribing witness.

JOSEPH G. YONKESE.

Witness:
W. W. HOFFMAN.